April 9, 1957    M. NOWOGRODZKI ET AL    2,788,490
CUTPUT POWER MEASUREMENT OF A PULSED MAGNETRON OSCILLATOR
Filed Nov. 26, 1952
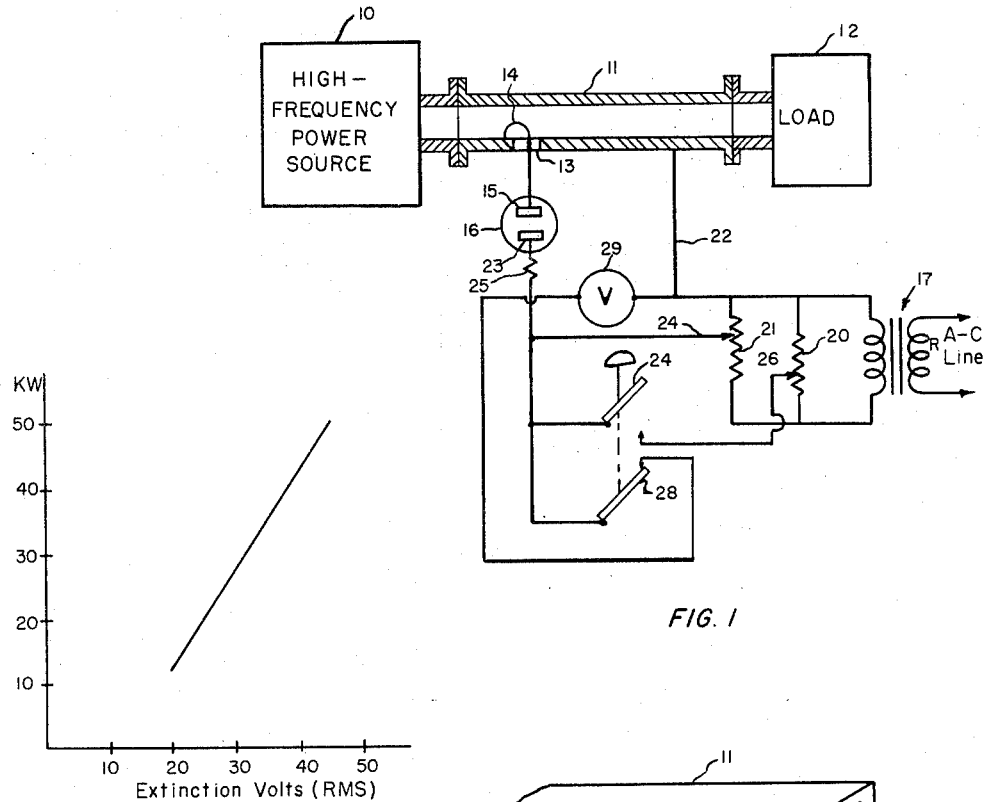
FIG. 1
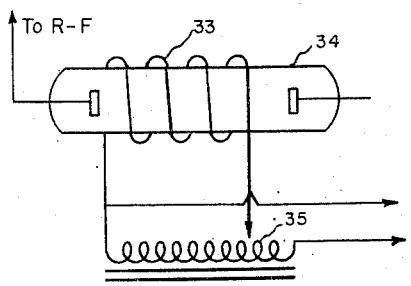
FIG. 3
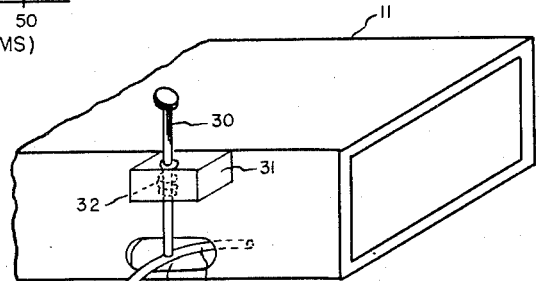
FIG. 2
FIG. 4
INVENTORS
VICTOR J. STEIN
MARKUS NOWOGRODZKI
BY
AGENT

United States Patent Office 2,788,490
Patented Apr. 9, 1957

2,788,490

OUTPUT POWER MEASUREMENT OF A PULSED MAGNETRON OSCILLATOR

Markus Nowogrodzki, New York, and Victor J. Stein, Peekskill, N. Y., assignors, by mesne assignments, to North American Philips Company, Inc., New York, N. Y., a corporation of Delaware Application November 26, 1952, Serial No. 322,612

2 Claims. (Cl. 324—122)

The present invention relates to apparatus for measuring high-frequency power levels and more particularly to indicating apparatus including a glow discharge device such as a neon tube for this purpose.

For measuring the power developed by a high-frequency wave generator, such as a magnetron, it has heretofore been known to use a neon tube as a power indicator. In one known arrangement, a glass capillary filled with neon is inserted into a slot in a waveguide which is coupled to a power source, thereby causing a visible glow discharge with an intensity depending on the power level of energy propagated in the waveguide. A photocell circuit is used to measure the intensity of the neon glow, thus providing an index to the power level. In another known arrangement, a neon tube, biased by a constant voltage, is coupled to the waveguide by a probe, and the resultant ionization current is measured to afford an indication of the power level. These conventional arrangements have been found to be unreliable and lacking in accuracy as compared to the standard water load technique wherein thermal changes in the load as a function of the applied power are measured.

The principal object of the present invention is to provide a neon tube power level indicator wherein the disadvantages in the prior art are obviated.

More particularly, it is an object of the invention to provide a neon tube power level indicator of simple design which is both reliable and accurate in operation.

Still another object of the present invention is to provide a neon tube power level indicator wherein the power level of the high-frequency excitation voltage applied to the tube is determined by measuring the magnitude of a relatively low-frequency voltage required to extinguish the tube. A feature of the invention is that the power level indicator does not introduce appreciable discontinuities into the transmission line thereby avoiding mismatch.

Briefly stated, in a power indicator in accordance with the invention, the neon tube is coupled to the high-frequency source to an extent sufficient to cause a glow discharge therein, which glow discharge is then extinguished by applying a low-frequency or direct voltage across the electrodes of the tube with a magnitude sufficient to disrupt said glow discharge. The magnitude of the voltage required to extinguish the glow provides an index to the high-frequency power level.

For a better understanding of the invention, as well as other objects and further features thereof, reference is had to the following detailed description of the invention to be read in conjunction with the accompanying drawing, wherein:

Fig. 1 is a schematic diagram of a preferred embodiment of the invention;

Fig. 2 is a modification of the invention shown in perspective;

Fig. 3 is a representative calibration curve; and

Fig. 4 is a schematic diagram of another embodiment of the invention.

Referring now to Fig. 1, there is illustrated a high-frequency power source 10, which may, for example, be a klystron or a magnetron oscillator, whose output circuit is coupled through suitable transmission line means, such as a waveguide section 11, to a load 12. In a practical embodiment as applied to a radar system, the load may take the form of a radar antenna which is fed by a high-frequency pulse generator, the neon tube power measuring device being coupled to the antenna transmission line and serving to provide a ready check on the output of the system.

Inserted through a slot 13 in the guide is a coupling loop 14, one end of which is connected to the inner wall of the waveguide, the other end of which is connected to one electrode 15 of a neon tube 16.

A transformer 17 is provided whose primary 18 is connected to a low-frequency alternating voltage source. Connected in parallel with the secondary 19 of the transformer are potentiometers 20 and 21, one end of said secondary being connected to the outer surface of the waveguide section by means of a conductor 22. The other electrode 23 of the neon tube is connected to the adjustable tap 24 of potentiometer 21 through a current-limiting resistor 25. The adjustable tap 26 of potentiometer 20 is connected through a push button switch 27 to the tap 24. Connected between conductor 22 and tap 24 via a switch 28 is a voltmeter 29 which may be a conventional alternating current meter or a vacuum tube voltmeter. Switch 27 is mechanically linked to switch 28 so that when switch 27 is caused to close, switch 28 is simultaneously caused to open.

The operation of the apparatus is as follows: Loop 14 is loosely coupled to the waveguide transmission line to an extent at which the high-frequency energy reaching the neon tube 16 is just capable of sustaining a visible glow discharge within the tube. If now a low-frequency or a direct-current potential difference is applied between the two electrodes of the neon tube, the visible glow will be extinguished, the magnitude of low-frequency voltage required to effect darkening of the glow being substantially proportional to the high-frequency energy flowing through the waveguide section. Thus the low-frequency voltage developed across the potentiometer 21 is applied between the electrodes 15 and 23 of the neon tube through coupling loop 14, the magnitude of this voltage being adjustable by means of the tap 24. The tap 24 is adjusted to a point at which the neon tube is darkened, the magnitude of the low-frequency voltage effecting said darkening being indicated by the alternating-current voltmeter 29 connected to tap 24 via normally-closed switch 28.

The theoretical explanation of the above-described phenomena as presently understood is as follows: The ionization of the neon gas by the high-frequency energy gives rise to a plasma region in the tube in which there exist equal concentrations of electrons and positive ions. These equal distributions may be destroyed by causing electrons to drift unidirectionally, thereby forming regions of positive ion accumulations within the plasma. This drift is brought about by the low-frequency extinction voltage, in which during say the positive half cycle of the voltage with respect to one electrode of the neon tube, the electrons are attracted toward said one electrode. The same effect may be brought about by a direct voltage rather than a low-frequency voltage and the invention is operable in either instance. In the event the extinction voltage is alternating in form, its frequency must be low enough to allow for a sufficient electron drift during a half cycle of an alternating current period in order to break down the plasma. In a practical embodiment, a 60 cycle line voltage was found satisfactory for this purpose. By virtue of the very loose coupling of the loop to the guide, substantially no discontinuities are introduced by the indicator, so that the problem of mismatch does not arise.

In a preferred embodiment of the invention it has been found advantageous to decouple the neon tube from the waveguide to the point where the propagated energy levels are below that necessary to initiate the glow discharge without an additional priming surge. By priming is meant the application of a voltage to the tube sufficient to initiate the glow discharge. The nature of gaseous discharge phenomenon is such that the priming voltage must be greater than the minimum voltage thereafter necessary to sustain the glow discharge once the discharge is initiated.

This priming may be accomplished in various ways. Thus in Fig. 1, there is provided the switch 27, preferably of the push-button type, connected between the tap 26 of potentiometer 20 and electrode 23 of the tube. By momentarily closing switch 27 and by adjusting tap 26 to a position at which the resultant surge applied across the electrodes is in a region high enough to initiate the glow discharge, the tube is thereby primed and the switch may then be kept open for the power measurement operation. It will be seen therefore that the low-frequency voltage in one region effects ionization and in a lower region causes extinction of an existing glow discharge. The coupling loop 14 is adjusted so that for a given high-frequency wave generator the high-frequency voltage applied to the neon tube in the absence of a priming surge is insufficient to ignite the tube but is adequate to sustain ionization after priming is effected. Closure of switch 27 effects opening of switch 28 so that the voltmeter 29 is disconnected during the application of priming voltage to the tube.

Another technique for priming of the neon tube is to increase momentarily the coupling factor of the loop to the guide. This may be accomplished, as shown separately in Fig. 2, by the use of a priming plunger 30 which is inserted through a guide piece 31 and is movable across the slot 13 in the guide, the loop 14 being arranged to loop under the plunger.

The plunger 30 is normally urged away from the slot 13 by means of a helical spring 32 contained within the guide piece 31. By manually pushing the plunger 30 momentarily into closer proximity to the loop, the coupling factor is increased, thereby causing a greater amount of high-frequency energy to enter the neon tube to effect priming. As soon as the tube is primed, as evidenced by the initiation of a glow discharge, the plunger is released and returns to its normal position, so that the energy fed to the tube is then sufficient to sustain ionization but is below the priming value.

In calibrating the neon tube power indicator, the reading on the voltmeter 29 throughout a range of power levels may be compared with the power reading obtained by any standard form of indicator such as a water load indicator. In this manner a graph may be developed in which, as is exemplified in Fig. 3, the low-frequency voltage necessary to effect extinction of the glow discharge is plotted against the peak power of a magnetron oscillator in terms of kilowatts. Obviously the graph may also be plotted in terms of average watts.

The extinction of the neon tube may also be effected by magnetic means rather than electrostatically. Thus as shown in Fig. 4, in lieu of applying a low-frequency or a direct voltage to the electrodes of the tube, the extinction voltage is applied to a coil surrounding the neon tube 34 to produce a magnetic field which extinguishes the glow discharge. Applied to the coil is an adjustable low-frequency extinction voltage obtained from an autotransformer 35. The operation of the device is otherwise similar to that in Fig. 1.

While there has been disclosed what at present are believed to be preferred embodiments of the invention, it is obvious that many changes may be made therein without deviating from the spirit of the invention.

What s claimed is:

1. Apparatus for measuring the power level of energy produced by a high-frequency wave source, comprising a neon tube having a pair of electrodes, a waveguide coupled to said source and provided with a slot, a coupling loop inserted in said slot and having one end thereof connected to the inner surface of said guide and the other end thereof connected to one of said electrodes and having a coupling factor with respect to said waveguide which is sufficiently great to sustain a glow discharge in said tube with energy from said wave source, means to increase momentarily the coupling factor of said coupling loop with respect to said waveguide to effect priming of said tube, means to apply an adjustable low-frequency voltage between the other electrode of said tube and the outer surface of said waveguide with a magnitude just sufficiently great to extinguish said discharge, and a low-frequency voltmeter connected between said other electrode and said outer surface of the waveguide.

2. Apparatus as claimed in claim 1, in which said means to increase momentarily the coupling factor of said coupling loop with respect to said waveguide, comprises a movable plunger positioned to be movable across said slot and adapted to be moved momentarily into closer proximity to said coupling loop thereby to increase said coupling factor.

References Cited in the file of this patent

UNITED STATES PATENTS

| | | |
|---|---|---|
| 2,321,605 | Keinath | June 15, 1943 |
| 2,429,614 | Frabutt | Oct. 20, 1947 |
| 2,533,769 | Couillard | Dec. 12, 1950 |
| 2,575,571 | Wheeler | Nov. 20, 1951 |
| 2,682,636 | Brewer | June 29, 1954 |
| 2,682,637 | Brewer | June 29, 1954 |

FOREIGN PATENTS

| | | |
|---|---|---|
| 983,545 | France | June 25, 1951 |

OTHER REFERENCES

Publication: CQ, March 1951, page 33.
Publication: "Radio Electronics," March 1952, pages 28, 29.